UNITED STATES PATENT OFFICE.

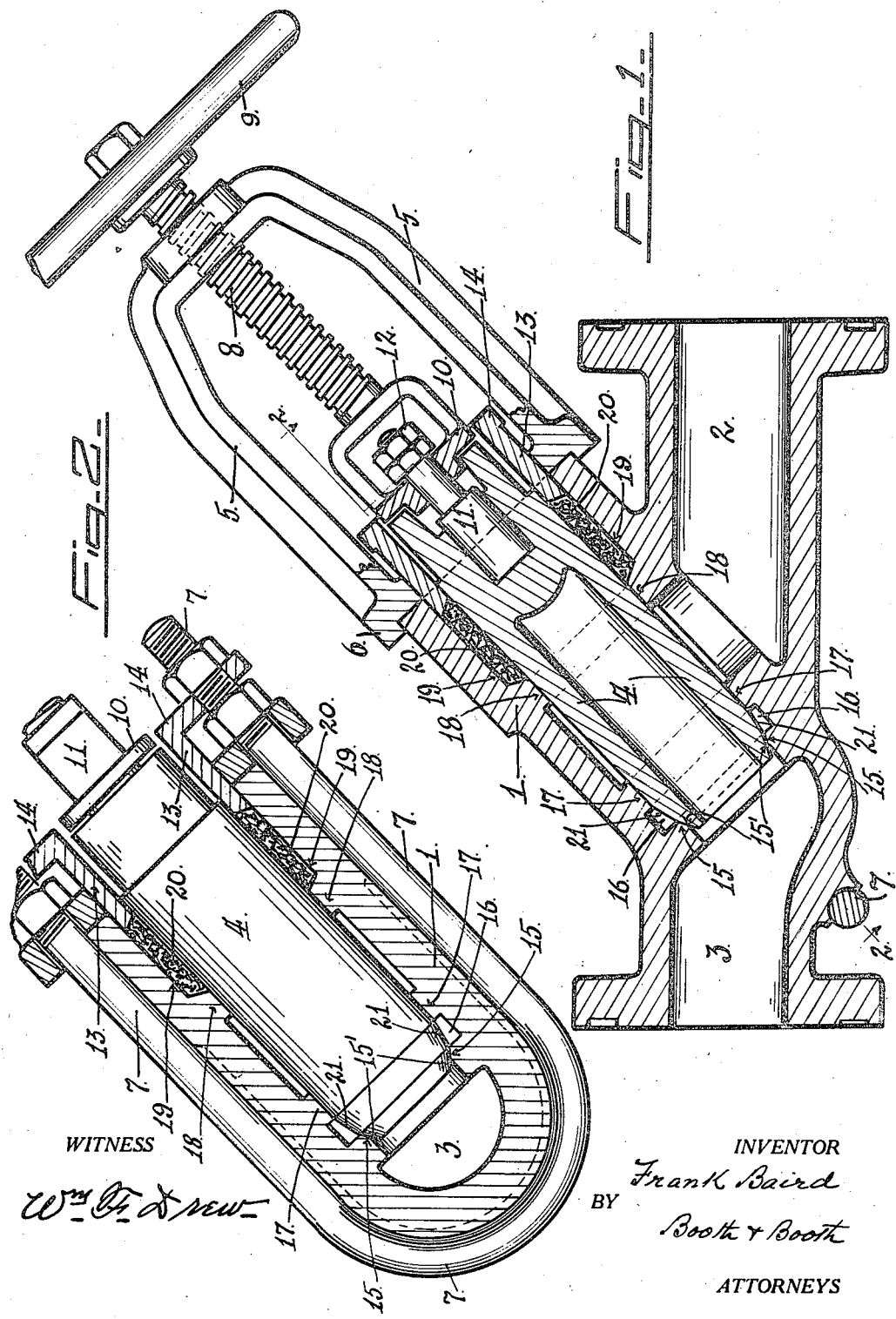

FRANK BAIRD, OF SAN FRANCISCO, CALIFORNIA, ASSIGNOR TO PACIFIC FOUNDRY COMPANY, OF SAN FRANCISCO, CALIFORNIA, A CORPORATION OF CALIFORNIA.

VALVE.

1,311,585.   Specification of Letters Patent.   Patented July 29, 1919.

Application filed November 15, 1918. Serial No. 262,643.

*To all whom it may concern:*

Be it known that I, FRANK BAIRD, a citizen of the United States, residing at the city and county of San Francisco and State of California, have invented certain new and useful Improvements in Valves, of which the following is a specification.

My invention relates to the class of valves primarily designed for the handling of acids and corrosive liquids.

Owing to the relatively high specific gravity, the corrosive nature of these liquids, and frequently to the nature of the chemicals in solution, it is most desirable to have as unrestricted a flow as possible through the valve. Hence though it follows that a gate-valve is most effective in this regard, I am not aware of any such type of valve being used for this purpose. In the so-called plug-cocks and globe-valves the flow of the liquid is much restricted; and, moreover, in cases where acids carry chemicals which tend to precipitate, this type of valve is difficult to clean when choked.

Since no high silicon iron, of which acid valves are usually made, is absolutely insoluble, the salts which form on the seating surfaces of a plug-cock, explain the freezing or sticking of this type of valve, which is the reason for such type falling into disfavor in the art.

In the case of the globe-valve in which a relatively small surface is relied on for the seat of the valve, a perfect polished surface for the metal to metal contact is deemed necessary for a pressure of say 50 lbs. per square inch. In practice, therefore, a valve of this type though remaining tight for a short time, will soon leak or sweat. An examination of the leaking valve shows that such polish as there was originally, has been removed, and the crystal structure of the material exposed. It is clear, then, that the leak is occasioned by the fact that when the valve is closed, only the high points of the crystals touch, so that the acid finds its way through the depressions.

Further, with regard to the globe-valve, a bonnet flange with a gasket is required. This is a source of annoyance, as the gasket is either eaten away so that it leaks, or it hardens and freezes the joints. The packing of a globe valve at the stem cannot be properly lubricated, because it must be severely compressed in the stuffing box, and in this condition it, with difficulty, absorbs a lubricant, which should in great measure, protect the packing. There is, then, no way to lubricate the valve stem which is in contact with the acid, and this objection is quite serious.

In view of this condition of the art, the objects I seek to attain by my invention may be briefly stated to be the provision of a valve-structure which allows an almost unrestricted flow of the liquid; which may be readily cleaned; which will remain tight; which protects the packing and provides for proper lubrication of the valve plug member; and which requires no bonnet.

To these ends my invention consists in the novel valve-structure which I shall now fully described by reference to the accompanying drawings in which Figure 1 is a longitudinal section of my valve.

Fig. 2 is a section on the line 2—2 of Fig. 1.

1 is the valve-body having the flanged inlet 2 and the flanged outlet 3, the inlet and outlet being alined and the body inclined thereto, thus providing a structure of the Y-type which is a compromise between a gate-valve and a globe-valve, but allows an almost unrestricted flow of the liquid and is easily cleaned in case of necessity. 4 is the valve-plug. 5 is a yoke, the foot-flange 6 of which is seated on the end of the body 1 and is held thereon by the U-bolt 7. 8 is a screw-stem, threaded in the head of the yoke and provided with a hand-wheel 9. The foot 10 of the screw-stem is freely fitted in the head of the valve-plug 4 and is rotatably connected therewith by means of a short-stem 11 cast in the head of the plug and passing through the foot of the screw-stem with nuts 12 on its top. 13 is a gland and 14 is its top flange, the latter receiving the legs of the U-bolt 7.

From the foregoing description the general assemblage and relation of parts will be understood.

In the base of the body 1 and lying in the zone of communication between the alined inlet and outlet of the structure is formed the seat 15 for the corresponding coacting extremity 15′ of the valve-plug 4.

Above the seat 15, the body 1 is annularly chambered at 16 to form a liquid seal and has in advance of this depression an annular elevation or seal ring 17.

The valve body 1, above the inlet is formed with another annular elevation or seal ring 18, and following this is a depressed portion 19 forming the chamber for the gland and for the asbestos packing 20, which in practice is saturated with a lubricant.

The valve-plug 4 is formed for a push-fit in the two seal rings 17 and 18, by which is meant that the clearance between the plug and rings is reduced to a minimum. The valve-plug near its inner end, between its straight wall and its seating extremity 15', is formed with a taper 21, having a width approximately equal to the width of the liquid seal depression 16 of the body, opposite to which it lies when the valve plug is seated.

It will be seen that due to the friction loss of the liquid flow at the seal-ring 17, and to the impact loss of two inelastic bodies at the liquid seal 16, the pressure on the valve-seat 15 is reduced, and in effect a double seated valve is produced, which overcomes leaking or sweating, so that the valve is practically tight at all times.

It will also be seen that due to the taper 21, acting in conjunction with the seal-ring 17, which action is gradual due to the taper, the danger of liquid hammer in the line is reduced to a minimum, even though the valve is closed rapidly, for the checking of the flow is quite gradual in closing.

The upper seal ring 18 acts in somewhat similar manner to the lower seal ring 17. It reduces the pressure, by friction and impact loss, on the packing 20. Consequently, the packing does not have to be compressed to any great extent. This, in turn, allows the packing to absorb the lubricant readily, which condition tends not only to protect the packing but furnishes a means to lubricate the valve-plug itself, which is very essential in preventing it from freezing or sticking. It will also be noted that the valve plug does not necessarily, and in fact does not turn in the packing upon being raised or lowered.

The general assemblage of the valve-structure as described does not require a bonnet, and thus a joint in the structure is eliminated.

I claim:

1. A valve structure comprising a body-member having an inlet and an outlet and having also a seat, an annular liquid seal depression in advance of said seat and an annular seal ring in advance of the depression, said seat, depression and ring lying within the zone of communication between the inlet and outlet, said body member having also above said communication a second annular seal ring and following it a chamber for a packing instrumentality; and a reciprocative valve-plug member having a push-fit in both seal rings of the body member and having also an extremity adapted to coact with the seat of said body member to open and close the valve.

2. A valve structure comprising a body-member having an inlet and an outlet and having also a seat, an annular liquid seal depression in advance of said seat an annular seal ring in advance of the depression, said seat, depression and ring lying within the zone of communication between the inlet and outlet, said body member having also above said communication a second annular seal ring and following it a chamber for a packing instrumentality; and a reciprocative valve-plug member having a push-fit in both seal rings of the body member and having also an extremity adapted to coact with the seat of said body member to open and close the valve and a tapered portion in advance of said extremity to lie opposite the liquid-seal depression of the body member when the plug-member is seated.

3. A valve-structure comprising a body-member having an inlet and an outlet and an intervening seat; a reciprocative plug-member to control the passage of fluid through said seat; a yoke fitted to the top of the body member; a U-bolt to hold said yoke to said body member; a screw-stem fitted in the yoke; a connection between said stem and the plug-member; and a packing instrumentality around said plug-member, and held in place by the U-bolt.

4. A valve-structure comprising a body-member having an inlet and an outlet alined with each other and inclined to the body-member, said body member having in the zone of communication between the inlet and the outlet an annular seat; a reciprocative plug-member to control the passage of fluid through said seat; a yoke fitted to the top of the body member; a U-bolt to hold said yoke to said body member, a screw-stem fitted in the yoke; a connection between said stem and the plug-member; and a packing instrumentality around said plug-member and held in place by the U-bolt.

In testimony whereof I have signed my name to this specification in the presence of two subscribing witnesses.

FRANK BAIRD.

Witnesses:
 WM. F. BOOTH,
 D. B. RICHARDS.